United States Patent
Claeys et al.

(10) Patent No.: US 6,180,053 B1
(45) Date of Patent: Jan. 30, 2001

(54) PROCESS FOR MANUFACTURING A BIODEGRADABLE BLOWN FILM

(75) Inventors: Ivan Claeys, Zemst/Hofstade; Claude Dehennau, Waterloo, both of (BE)

(73) Assignee: Solvay S.A. (Societe Anonyme), Brussels (BE)

( * ) Notice: Under 35 U.S.C. 154(b), the term of this patent shall be extended for 0 days.

(21) Appl. No.: 09/079,402

(22) Filed: May 15, 1998

(30) Foreign Application Priority Data

May 16, 1997 (BE) .................................... 09700434

(51) Int. Cl.[7] ............................ B29C 49/08; B29C 49/04
(52) U.S. Cl. ................ 264/564; 264/211.24; 264/331.21
(58) Field of Search ............................... 264/211.24, 555, 264/563, 564, 330, 331.11, 331.21

(56) References Cited

U.S. PATENT DOCUMENTS

| 3,021,313 | 2/1962 | Cox et al. . | |
|---|---|---|---|
| 5,468,837 | * 11/1995 | Wautier | 528/357 |
| 5,633,342 | * 5/1997 | Verser et al. | 528/355 |

FOREIGN PATENT DOCUMENTS

| 0626405A1 | 11/1994 | (EP) . |
| 0708148A1 | 4/1996 | (EP) . |
| 0775720A1 | 5/1997 | (EP) . |
| 06143412 | 11/1992 | (JP) . |
| 05132572 | 5/1993 | (JP) . |
| 6814418 | 4/1969 | (NL) . |
| WO 90/05157 | 5/1990 | (WO) . |
| WO 97/10280 | 3/1997 | (WO) . |
| WO 97/41165 | 11/1997 | (WO) . |

OTHER PUBLICATIONS

"Macromolecular Engineering of Lactone–Based (CO) Polymers for Biomedical Applications", vol. 32, No. 1, Jan. 1, 1991.

* cited by examiner

Primary Examiner—Jan H. Silbaugh
Assistant Examiner—Kenneth M. Jones
(74) Attorney, Agent, or Firm—Venable; Marina V. Schneller

(57) ABSTRACT

Process for manufacturing a blown film essentially consisting of an aliphatic polyester, according to which:
(1) the polyester is synthesized from at least one cycloaliphatic ester, with the intervention of an initiator comprising at least one metal trialkoxide and/or metal tetraalkoxide, in an extrusion device;
(2) the polyester is extrusion blow-moulded, immediately after it has been synthesized in the said extrusion device, fitted for this purpose with an extrusion blow-moulding die, with a swelling ratio of at least 2.5.

The invention also relates to a film essentially consisting of an aliphatic polyester, which can be obtained according to the process of one of the preceding claims, in which the modulus of longitudinal elasticity (LE) and the modulus of transverse elasticity (TE) and the longitudinal shrinkage (LS) and transverse shrinkage (TS), these shrinkages being measured at a temperature about 5° C. below the melting point of the polyester, respect the following relationships:

$$TE \geq LE \text{ and } TS \leq LS.$$

12 Claims, No Drawings

PROCESS FOR MANUFACTURING A BIODEGRADABLE BLOWN FILM

The present invention relates to a process for manufacturing a biodegradable blown film.

Various industries are increasingly seeking biodegradable polymers. Such polymers are, for example, aliphatic polyesters such as ε-caprolactone polymers (referred to more simply as poly-ε-caprolactones, or PCL). These polymers constitute well-known biodegradable and biocompatible thermoplastic polymers, whose most promising openings lie, precisely on account of these specific properties, in the field of films, such as films for packaging, for protecting crops or for disposable nappies.

However, in certain applications, these polymers have unsatisfactory Theological properties, in particular as regards the manufacture of blown films. It is known in particular that the manufacture of PCL-based blown films is difficult and often leads to instability of the bubble, resulting in unacceptable fluctuations in the properties of the film obtained. This leads to the flow rates and the swelling ratios (radial) and draw ratios (axial) being greatly limited, thus reducing the advantage of this technique; in particular, this limits the width of the film and thus the yield of the manufacturing line. In addition, the operating conditions as a whole must be the subject of limitations and/or precise regulation, in order to avoid any risk of instability. This situation is regrettable, given that extrusion blow-moulding constitutes a particularly advantageous and economical process for manufacturing films when it is not subjected to such constraints. Moreover, the need to limit the extrusion temperature (for the sake of stability) does not always make it possible to obtain a film with a satisfactory surface state.

To overcome these problems, various solutions have already been proposed, each being carried out starting with granules of a presynthesized polymer. One solution consists, in particular, in cooling the bubble using refrigerated air, which makes it possible to accelerate the crystallization, to lower the neck of the bubble and thus to stabilize the bubble. In a comparable manner, Japanese patent application JP 06/143,412 proposes to use water-cooling of the bubble. This solution is complex and does not make it possible to exceed a swelling ratio of 2. In addition, this abrupt cooling rigidifies internal constraints in the film, which leads to considerable shrinkage if the film is subsequently heated. Document EP 708,148 confirms that the extrusion blow-moulding of aliphatic polyesters is extremely difficult, and alternatively suggests facilitating it by mixing these polyesters with from 5 to 50% of polymers bearing polar groups: the films thus obtained are thus not fully biodegradable. Certain Theological properties of aliphatic polyesters, in particular their behaviour in the molten state, can moreover be improved by increasing their molecular mass, but this leads to an increase in the viscosity, which causes an increase in the mechanical energy consumption and higher self-heating in the extruder. Now, such an increase in temperature slows down the crystallization, such that the sheath runs the risk of rewelding between the pinch rolls in certain cases. An excessive temperature can also give rise to degradation of the polymer. Moreover, the batchwise synthesis of very high molecular mass PCL in an autoclave is impossible to carry out in an economically viable manner, since the viscosity of the polymer excessively extends the time required to empty the autoclave, imposes the use of more powerful mixers and reduces the efficacy of the heat exchange with the walls. It may also be added that an increase in the viscosity causes considerable efforts in radial and axial drawing to be required, which induce constraints and then give rise to considerable shrinkage.

Consequently, the present invention is directed towards providing a process for manufacturing blown films essentially consisting of an aliphatic polyester, which is simple and of high stability. This stability would thus make it possible to achieve high swelling ratios and draw ratios, without requiring a high molecular mass; more generally, this stability would reduce the requirements imposed in the regulation of the operating conditions.

More precisely, the present invention relates to a process for manufacturing a blown film essentially consisting of an aliphatic polyester, according to which:
(1) the polyester is synthesized from at least one cycloaliphatic ester, with the intervention of an initiator comprising at least one metal trialkoxide and/or metal tetraalkoxide, in an extrusion device;
(2) the polyester is extrusion blow-moulded, immediately after it has been synthesized in the said extrusion device, fitted for this purpose with an extrusion blow-moulding die, with a swelling ratio of at least 2.5.

The fact that the synthesis of the polymer and its use are simultaneous offers several advantages, in particular as regards the simplicity (single apparatus) and the cost efficiency (only one heating). As regards the cost efficiency, this process also makes it possible to dispense with a step of granulation, of packaging and of storage. Moreover, it allows any manufacturing error to be detected without delay, in contrast with the conventional process in which it may transpire that an entire batch has to be eliminated when a problem is detected during its use, which is not simultaneous with its synthesis. In addition, it has been observed, surprisingly, that, according to this process, the extrusion blow-moulding takes place in an extremely stable manner, even with high swelling ratios and/or high draw ratios, with polyesters of low molecular mass, and/or at high temperatures.

As indicated above, the aliphatic polyester of which the film is essentially made is synthesized from at least one cycloaliphatic ester, by opening of the ring. This mode of synthesis is preferable, in the perspective of a synthesis in an extruder, to modes of synthesis involving a polycondensation reaction, which releases water. As examples of cycloaliphatic esters which can be used, mention may be made of lactones and lactides (for example 3,5-dimethyl-1, 4-dioxane-2,6-dione or 1,4-dioxane-2,6-dione (diglycolic anhydride)). One or more lactones (ε-caprolactone, β-propiolactone, δ-valerolactone, etc.) are advantageously used.

The polyester can either be a homopolymer obtained from a single cycloaliphatic ester or a copolymer obtained from several different cycloaliphatic esters. It is preferred to use homopolymers, and most particularly polylactone homopolymers. In the context of the present invention, copolymers comprising at least one cycloaliphatic ester as well as up to 20% (on a molar basis) of one or more other cyclic comonomers which can be copolymerized by ring opening, for example chosen from cyclic carbonates, cyclic anhydrides and cyclic amides, are also considered as aliphatic polyesters. With a view of obtaining a biodegradable polymer, an aliphatic comonomer will preferably be chosen, for example tri-methylene carbonate, 2,2-dimethyltrimethylene carbonate, propylene carbonate or succinic anhydride.

The copolymers can be random or block copolymers. In order to obtain block copolymers, the process can be performed in particular starting with oligomers, or alternatively the monomers can be introduced at different places in the extruder.

Advantageously, the polyester is a poly-ε-caprolactone (PCL), i.e. an ε-caprolactone homopolymer. Advantageous results have been obtained when the polyester has a number-average molecular mass ($M_n$) of less than 74,000 g/mol; these results are noteworthy when $M_n$ is less than 60,000 g/mol and in particular less than 50,000 g/mol. These values are particularly low when compared with the molecular masses which have been used hitherto for the purpose of blowing films based on such polyesters.

It will be noted that these preferred values relate to the molecular mass which the polyester has in the film finally obtained, i.e. after optional hydrolysis of any hydrolysable bonds. It may thus be that the polyester has a much higher molecular mass (for example three times as high) at the level of the extrusion blow-moulding die.

The polyester is synthesized in the presence of an initiator comprising at least one metal tri- or tetra-alkoxide, based on a metal which is well known for this use, such as aluminium or yttrium, or alternatively Sm, Lu or Nd. Further details regarding these compounds are given below by means of examples concerning aluminium trialkoxides, without this choice having any limiting nature. The alkoxide used (or one or more of them) can optionally be oligomeric, i.e. it can result from the prepolymerization of a suitable monomer (for example ε-caprolactone) with a monomeric tri- or tetraalkoxide; such oligomeric alkoxides generally have a number-average molecular mass of about 500 to 2000. In addition to one or more metal tri- and/or tetraalkoxides, the initiator can also comprise one or more alcohols such as, for example, 1,1,1-trimethylolpropane, butanediol, 1-hexadecanol, methoxyethanol, etc. Methoxyethanol is preferably used as alcohol.

A metal tri- or tetraalkoxide can optionally be synthesized in situ, for example by reaction of an alkylaluminium with an alcohol, or of a halide with an epoxide.

The use of at least one metal tri- or tetraalkoxide allows branched polyester chains to be synthesized. Without this explanation being either restricting or limiting, it is considered that this branching exerts a beneficial influence on the rheological properties of the composition during its use by extrusion blow-moulding. It is thus during this use (on leaving the extrusion blow-moulding die) that it is important for at least some of the polymer chains to be branched; any disappearance of the branching (for example by hydrolysis under the effect of ambient air moisture) subsequent to the manufacture of the film is not considered as critical.

In addition to one or more tri- or tetrafunctional alkoxides, the initiator can optionally comprise one or more mono- or bifunctional alkoxides, provided that their amount does not exceed 80 mol % relative to the total amount of initiator.

The initiator can also optionally comprise one or more crosslinking agents such as, for example, a peroxide. Peroxides which can be used for this purpose are, in particular, tert-butylcumyl peroxide, dicumyl peroxide and tert-butyl peroxybenzoate; their amount is generally from 0.05% to 1% by weight relative to the monomer(s).

The polyester is preferably synthesized with the intervention of an initiator comprising at least one metal trialkoxide. Preferably, at least 20% (on a molar basis), relative to the initiator, consists of one or more metal trialkoxides. In a particularly preferred manner, the metal trialkoxide is an aluminium trialkoxide.

The term aluminium trialkoxide is understood to refer to any organoaluminium compound containing three aluminoxane-carbon bonds (>Al—O—C—). As examples of similar trialkoxides, mention may be made of those corresponding to the general formula $$R—O—Al(OR'')—O—R' \qquad (I),$$

in which R, R' and R'' represent, independently of each other, a linear or branched hydrocarbon radical containing from 1 to 16 carbon atoms, preferably from 2 to 8 carbon atoms. Preferably, R, R' and R'' are identical and represent a linear or branched alkyl radical containing from 2 to 6 carbon atoms. These trialkoxides can be prepared "in situ" by using trialkylaluminiums and alcohols. As representative examples of trialkoxides of type (I), mention may be made of aluminium triisopropoxide and aluminium tri-sec-butoxide.

As examples of trialkoxides which can also be used, mention may be made of aluminium trialkoxides in which at least one alkoxy radical comprises, besides the oxygen atom constituting the aluminoxane bond (Al—O), at least one other oxygen atom, the latter preferably being in the form of an ester or ether function.

As examples of aluminium trialkoxides containing an ether bond, mention may be made of the trialkoxides corresponding to the statistical general formula $$(R_1—O)_{3-n}—Al—(O—R_2—O—R_3)_n \qquad (II)$$

in which:

n represents a number from 1 to 3, $R_1$ represents a linear or branched alkyl radical containing from 1 to 16 carbon atoms, preferably from 2 to 8 carbon atoms, $R_2$ represents a linear or branched alkylene radical containing from 1 to 10 carbon atoms, preferably from 2 to 8 carbon atoms, $R_3$ represents an alkyl or aryl radical containing from 1 to 6 carbon atoms, preferably an alkyl radical containing from 1 to 4 carbon atoms.

As a representative example of trialkoxides of type (II), mention may be made of tri(methoxyethoxy)aluminium.

As examples of aluminium trialkoxides containing an ester bond, mention may be made of the trialkoxides corresponding to the statistical general formula $$R_4—X_n—O—Al(O—X_m—R_6)—O—X_p—R_5 \qquad (III),$$

in which:

X represents a radical derived from ε-caprolactone, of formula —(CH$_2$)$_5$—C(O)—O—;

n, m and p represent, independently of each other, integers from 0 to 12, the sum of which is at least equal to 1 and does not exceed 12, and preferably is at least equal to 3 and does not exceed 10;

$R_4$, $R_5$ and $R_6$ represent, independently of each other, an alkyl radical containing from 1 to 10 carbon atoms, and, preferably, are identical and represent an alkyl radical containing from 2 to 8 carbon atoms.

As a representative example of trialkoxides of type (III), mention may be made of that in which the sum of n, m and p is equal to 8 and $R_4$, $R_5$ and $R_6$ represent the sec-butyl radical.

The amount of alkoxide to be used depends essentially on the number-average molecular masses ($M_n$) targeted. There is a virtually linear relationship, independent of the polymerization temperature, between the ratio of the amounts of monomer(s) and of alkoxide used and the average molecular mass of the polyester produced, such that it is easy to calculate the relative amounts of alkoxide to be used. As an example, in the case of the continuous manufacture of ε-caprolactone in an extruder, the relationship between the supply rates of monomer (Dm) (mass flow rate: g/min) and of initiator (Dam) (molar flow rate: mol/min) to the extruder correspond to the following equation:

$$M_n = Dm(N*Dam)$$

in which N represents the number of alkoxide functions in the initiator, increased, where appropriate, by the number of hydroxyl functions which may be present. Thus, in the case of an initiator comprising 1 mol of aluminium tri-sec-butoxide and 1 mol of methoxyethanol, N=4.

Ideally, all of the reactants used in the polymerization should be substantially anhydrous, However, residual water contents not exceeding 100 mg/kg of monomer, and even more particularly not exceeding 50 mg/kg of monomer may be tolerated, since they have no significant influence on the molecular mass.

Since the polymerization temperature has no significant effect on the molecular mass, it can, without inconvenience, vary over quite a wide range and does not necessarily need to be the same in the various zones of the polymerization reactor. However, it is essential that it is at least equal to the melting point of the polyester produced. In order to fix the ideas, the minimum temperature for the homopolymerization of $\epsilon$-caprolactone is at 60° C. Higher temperatures allow the rate of polymerization to be accelerated. In practice, still for the homopolymerization of $\epsilon$-caprolactone, 170° C. will generally not be exceeded, and preferably 160° C. will not be exceeded, such that it is not necessary to carry out intermediate cooling between the synthesis and the immediately consecutive extrusion blow-moulding.

In this temperature range, degrees of conversion and yields of close to 100% are generally obtained for average residence times of the reaction mass in the reactor not exceeding about 10 minutes and usually not exceeding 6 minutes, or even 3 minutes.

In the context of the present invention, the characteristic according to the film "consists essentially" of aliphatic polyester is intended to exclude the possible presence of more than 5% by weight of polymer(s) which might not be aliphatic polyesters. Where appropriate, such other polymers are advantageously also biodegradable. They are preferably absent. Besides an aliphatic polyester and optionally up to 5% of one or more other polymers, the film can optionally comprise up to 5% by weight of monomeric or oligomeric additive(s). These additives can be, in particular, antioxidants, stabilizers, nucleating agents, antiblocking agents, etc.; their water content is preferably less than 1 g of water per kg of supplemented polymer.

Moreover, the film can optionally comprise up to 50% (relative to the total weight of the film) of one or more fillers. These fillers are preferably inorganic (calcium carbonate, calcium sulphate, dolomite, talc, kaolin, etc.) or of natural origin (starch, wood flour, cellulose and derivatives thereof, recycled paper, etc.). Surprisingly, it has been observed that the presence of 15% to 50% by weight of one or more fillers, relative to the weight of the polyester, in particular of calcium carbonate, does not compromise the stability of the bubble and improves the tear strength of the film. This observation is surprising since it is generally accepted that the presence of inorganic fillers increases the risks of tearing of the film and of instability of the bubble. The process of the invention is thus doubly advantageous in the view of manufacturing charged films, since, on the one hand, the proportion of fillers can be increased without any obligation to reduce the swelling ratio or the draw ratio, and, on the other hand, the properties of the film thus obtained are improved.

In the context of the present invention, the term extrusion device is understood to denote any device which makes it possible both to synthesize the polyester from the various ingredients (monomer(s), initiator, optional additives and/or optional fillers) and to expel the composition thus obtained through a suitable die, in the molten state. It can be, for example, a polymerization reactor equipped with a suitable die as well as means for supplying the die with molten polymer at an adequate flow rate (for example a geared pump). It can also be an extruder in the conventional sense of the term, comprising one or more endless screws rotating in a sleeve at the end of which is also installed a suitable die.

In order to manufacture a blown film, the die used must have well-known characteristics. Such a die is generally ring-shaped, for example oval or, preferably, circular in shape, and is equipped with means for injecting a gas into the central zone of the extruded preform, so as to form an approximately cylindrical "bubble" and bring about radial drawing (swelling) of the film.

In the case of the synthesis of poly-$\epsilon$-caprolactone, the temperature of the plastic material in the die generally does not exceed 180° C. Preferably, it does not exceed 160° C. It is advantageously from 120 to 150° C. For other types of aliphatic polyesters, the temperature of the composition at the exit of the die must be greater than the crystallization temperature of the polymer, and less than 220° C., preferably less than 190° C.

The use of such a device makes it possible, in accordance with the invention, to synthesize the polyester and extrude it in-line, i.e. in an immediately consecutive manner. This is in contrast with the conventional processes for manufacturing articles based on aliphatic polyesters, according to which the polyester is manufactured in the molten phase in a first step, after which it is solidified, typically in the form of granules, and is converted into finished product in a second step, during which it is again made to melt. As regards the process of the present invention, it requires that the various ingredients (monomer(s), initiator, optional additives and/or optional fillers) be introduced directly into the extrusion device. Such a way of proceeding proves to be advantageous, in particular as regards the Theological properties and the cost efficiency.

In a known manner, after it leaves the die, the plastic material is drawn under the effect of the pressure of the gas injected into the "bubble" thus formed. The pressure of this gas is one of the factors which determine the swelling ratio, i.e. the radial drawing to which the film is subjected. The swelling ratio can be calculated in particular by dividing the final perimeter of the bubble by the circumference of the die. In order to cause the film to solidify, cooling means are generally provided around the bubble. Such means can be, in particular, a ring device, encircling the bubble, fitted with orifices via which a gas whose temperature is less than that of the film, often air at room temperature, is blown onto the film. It is preferable for the film in the course of extrusion blow-moulding to be cooled exclusively by a stream of gas, which excludes, in particular, cooling with water.

Once the film has solidified, the bubble is generally pinched between two parallel rollers, beyond which a film in the form of a flattened sheath is thus obtained, which can then, for example, be wound on a mandrel, optionally after it has been split and opened.

The axial draw ratio (Te) (more simply referred to as the "draw ratio", as opposed to the "swelling ratio") is determined by the speed of the material leaving the die as well as by the linear speed of the film (V) after drawing (measured, for example, at the bubble pinch rolls). It can be calculated in particular by the formula Te=V*Sf/Dm, in which Dm denotes the total flow rate, by volume, of the extrudate (monomer(s), initiator, optional additives and/or optional fillers, etc.) and Sf denotes the passage cross-section of the die. The process of the invention makes it easily possible to achieve a draw ratio of at least 2.5, without causing any problems of bubble stability. It also makes it possible to achieve a swelling ratio and a draw ratio of at least 3, and even of at least 4. It goes without saying that such ratios are impossible to achieve (without causing instability) using the previously known processes for the extrusion blow-moulding of the polymers concerned. The final thickness of the film is generally about from 10 to 100 mm.

As outlined above and as confirmed by the examples which follow, the process of the invention has a stability range which is considerably wider than that of the known processes. It can thus be regulated less precisely, and/or the limitations imposed on its operating conditions can be less strict (including those regarding the molecular mass of the polymer). This makes it possible in particular to increase the swelling ratio and the draw ratio (and thus the width of the film), the temperature of the die (which reduces the mechanical energy consumption and improves the surface aspect of the film) and the flow rate of the extrusion device (which increases the production efficiency of the plant).

The films manufactured according to the process of the invention can be used in particular for manufacturing biodegradable bags (in particular for wrapping domestic waste), or alternatively biodegradable sanitary articles such as nappies.

It has been observed that the process of the invention makes it possible to manufacture films having surprising mechanical properties.

To this end, the present invention also relates to a film consisting essentially of an aliphatic polyester, which can be obtained according to the process of one of the preceding claims, in which the modulus of longitudinal elasticity (LE) and the modulus of transverse elasticity (TE) and the longitudinal shrinkage (LS) and transverse shrinkage (TS), these shrinkages being measured at a temperature about 5° C. below the melting point of the polyester, respect the following relationships:

$TE \geq LE$ and $TS \leq LS$.

This surprising characteristic gives the film extremely favourable mechanical properties, such as excellent resistance to perforation. Such films can also be very advantageously used for the manufacture of printed sheaths intended to be slipped around plastic bottles.

For the definition of the aliphatic polyester, reference will be made to the details provided above in relation to the process. The process is aimed in particular at polyesters derived from at least one cycloaliphatic ester, preferably those derived from at least one lactone. This is advantageously poly-ϵ-caprolactone. One or more fillers and/or common additives can be present, under the conditions indicated above.

Preferably, the polyester is synthesized with the intervention of an initiator comprising at least one metal trialkoxide and/or metal tetraalkoxide. This is not only a characteristic relating to the process for manufacturing this film, but also an objective characteristic, since the fact that such a compound has been used is still detectable in the film even if the said alkoxide reacts chemically with the monomer(s) used and/or even if certain bonds become hydrolysed.

EXAMPLES

The examples which follow illustrate the invention in a non-limiting manner. Examples 1–14 are in accordance with the invention and Examples 15R–29R are given for comparative purposes.

The illustrative examples demonstrate that the operating conditions of the process of the invention can undergo very wide variations without harming the stability of this process. In contrast, the comparative examples confirm that comparatively small variations are sufficient to make the known prior processes unstable.

The equipment used for Examples 1–14 comprises, from the upstream end to the downstream end:
a Werner & Pfleiderer® ZSK25 co-rotating twin-screw extruder,
a Normag® MHDP-110/078(E)X geared pump,
a 90° elbow, which allows the extruder (horizontal) to be connected to the die (vertical),
a ring-shaped die for the manufacture of blown film, with a core 30 mm in diameter and a 1 mm air gap,
a cooling-air distributor, 6 cm in diameter, surrounding the bubble about 2.5 cm above the die,
a device for pinching the bubble (comprising two horizontal, parallel pinch rolls) and for rolling the film; the "lay-flat width" parameter mentioned below represents the width of the bubble after it has been pinched (flattened sheath), i.e. one-half of the perimeter of the sheath.

The height of the blown bubble (distance between the die and the pinch rolls) is equal to 0.86 m. The cooling air is at room temperature. The air inside the bubble is initially at room temperature, and is not renewed during the test.

The monomer is pure ϵ-caprolactone (Solvay Interox) (referred to hereinbelow as "ϵ-CL"). The polymerization initiator consists of an equimolar mixture of aluminium tri-sec-butoxide and methoxyethanol, dissolved at a proportion of 33% by weight in 4-cymene (solvent not participating in the polymerization). This initiator is miscible with the monomer ϵ-CL. The monomer and the initiator are introduced via separate conduits into the first zone of the extruder.

The extruder sleeve is composed of 10 elements. There is no degassing. The 7th sleeve element accepts a filling screw, which serves, where necessary, to introduce fillers.

The filler employed in Examples 10–14 is a natural calcium carbonate, surface-treated in order to increase its affinity for the apolar polymers (Omya® BLH). In Examples 13–14, this filler was predried (in an oven, under vacuum, at 100° C. overnight).

Characterization of the films

Table 1 collates the conditions of use and a number of characteristics of the films produced according to the invention.

$M_w$ and $M_n$ respectively denote the weight-average and number-average molecular masses, calculated from the molecular mass distribution, measured by steric exclusion chromatography at 25° C. after dissolving to 2 g/l in tetrahydrofuran (THF), and after filtering in the case of compositions containing fillers (Ex. 10–14). It will be noted that in the case of permanent branching (non-hydrolysable) (Ex. 27–29), the chromatography underestimates the actual molecular mass.

The theoretical number-average molecular mass $M_{nTh}$ is directly proportional to the ratio of the mass flow rates of monomer (Dmm) (kg/h) to the molar flow rate of initiator (Dma), expressed as moles of Al per hour: $M_{nTh}=Dmm/(4*Dma)$.

The parameter "max. temperature" denotes the maximum temperature recorded on the implementation equipment. The temperature of the material at the die is generally below this value.

The linear speed of the film is measured on the bubble pinch rolls.

The longitudinal shrinkage (LS) and transverse shrinkage (TS) are evaluated as follows: a square with a side length of 100 mm is cut out of the film, with one edge parallel to the direction of the implementation. The sample, placed on a smooth support coated with talc in order to avoid any adhesion, is then introduced into a ventilated oven preheated to 57° C. Once the oven temperature has become reestablished at 57° C. (the introduction of the sample generally causing a temperature fall in the oven), the sample is left in the oven for 15 minutes. The dimensions of the sample are measured before and after the treatment, along a line drawn about 2 cm from each edge (4 measurements per sample). The measurements are taken at least twice for each film (on separate samples), and the average of each group of values is calculated. In the examples which follow, the average of two measurements was determined each time. The temperature of 57° C. was used for the films based on PCL homopolymer; in the general case, the temperature is 5° C. below the melting point of the polyester. It will be noted that, even if it can modify the absolute values of TS and LS, a slight difference in temperature relative to this value ($T_f-5$) will not modify the relationship TS≦LS.

The modulus of elasticity (E) is measured according to ISO standard 527-3/1993 on type 2 test pieces, at a tensile speed of 1 mm/min, in the longitudinal direction (LE) and transverse direction (TE), based on the segment 0.05%–0.25% of the tensile curve. The elongation at break ($\epsilon_b$) is evaluated according to the same standard with a speed of 500 mm/min, also in the longitudinal (L) and transverse (T) directions.

Description of Examples 1–14
(in accordance with the invention) (Table 1)

Examples 1–5

This series illustrates the stability of the bubble relative to an increase in the draw ratio. It is observed that even at axial draws of greater than 20, corresponding to a thickness of 10 mm, the bubble remains stable. These films have a high elastic modulus and a longitudinal shrinkage of greater than 1%.

Example 6

The very high molecular mass of the polymer makes the film leaving the die very elastic. Radial and axial drawing thus require considerable effort, which induces constraints and subsequently gives rise to considerable shrinkage.
The surface of the film is very coarse owing to breaks in flow.

Examples 7–8

These two films show that a swelling ratio of about 5 does not destabilize the bubble. Higher radial draws could not be tested since the width of the film would then exceed the width of the pinch rolls. These examples also prove that higher flow rates are accessible. The temperature of the material at the die (144° C.) poses no problems by virtue of the stability of the bubble.

Example 9

The bubble is stable despite the very low molecular mass of the polymer.

Examples 10–11

Manufacture of films containing 15% calcium carbonate (not predried). Example 11 shows that neither a large draw nor a high working temperature managed to destabilize the expanded bubble, despite the presence of inorganic fillers.

Example 12

This film contains 25% by weight of non-dried calcium carbonate. The molecular mass $M_w$ of the polymer (60 kg/mol) is less than 74 kg/mol.

Example 13

This film is manufactured under conditions identical to those of Example 9, except that 26% of dry $CaCO_3$ are added.

Example 14

This example demonstrates that up to 36% of inorganic fillers can be incorporated.

Comparative Examples 15R–26R (Table 2)

For comparative purposes, polycaprolactone granules were manufactured by reactive extrusion in a first step, and then used to manufacture a blown film in a subsequent second step (in contrast with the one-step process in accordance with the invention). The initiator used during the first step (synthesis) consisted of a branched prepolymer obtained by reacting 8 mol of ε-caprolactone with 1 mol of aluminium tri-sec-butoxide. After their synthesis, the extruded rods are cooled in a tank of cold water, dried by blowing with air, then granulated and stored.

In order to manufacture a blown film, these granules are then supplied into a Dolci® 20 extruder, equipped with a screw 20 mm in diameter and 482 mm in length, having a compression factor of 1.75. The extrusion blow-moulding die has an outside diameter of 30 mm and a core 28.5 mm in diameter (air gap of 0.75 mm). The film is cooled by an annular nozzle blowing air at ambient temperature, this nozzle being located 40 mm from the die.

Each of the groups of Examples 15R to 18R, 20R and 21R, 22R to 24R, 25R and 26R, as well as 28R and 29R, relate to the same product, but tested under different conditions.

The main operating conditions are summarized in Table 2. In this table, the stability of the bubble of film during the extrusion blow-moulding was classed as follows:

"OK" when the diameter of the blown bubble remained constant; it was only in these cases that the bubble was stable;

"Limits" when the dimensions of the film fluctuated slowly;

"Vibrates" when the variations in diameter were rapid, but of low amplitude;

"Pulses" when the process was well beyond the stability limit: the neck of the bubble rises and falls several cm per second, the bubble diameter changes by several cm without the extrusion conditions being modified.

The data summarized in Table 2 show that:

a weight-average molecular mass ($M_w$) of 65,000 g/mol does not make it possible to obtain a stable bubble under the conditions tested (in contrast with Ex. 9);

no polycaprolactone could be blown to a draw ratio of greater than 3.5 and the swelling ratios were modest (≦4), despite the relatively low working temperatures;

the stability range is very narrow. Small increases in radial or axial drawing or slight heating of the material (by raising the extruder temperatures or by increasing the flow rate) are often sufficient to destroy the equilibrium.

Furthermore, the rheology of these products changes during storage. The strain hardening, which favours the stability of the bubble during the extrusion blow-moulding, gradually disappears. This gradual deterioration in suitability for use is, quite obviously, highly undesirable.

Comparative Examples 27R–29R (Table 3)

Other comparative examples (Table 3) were carried out by synthesizing the polymer in an autoclave in the first step (using a catalyst such as stannous octoate). The initiator used was an equimolar mixture:

of butanediol and of PCL CAPA® 316 (of functionality 4) for Example 27R, or of cetyl alcohol and of PCL CAPA 310 (of functionality 3) for Examples 28R–29R.

When compared with the process of the invention, a loss of stability at fairly low swelling ratios and draw ratios and at low working temperatures is again found.

TABLE 1

| | | Examples | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Flow rate of monomer (CL) | kg/h | 2.70 | 2.70 | 2.70 | 2.70 | 2.70 | 2.75 | 4.60 | 4.65 | 2.40 | 3.41 | 3.41 | 3.10 | 2.39 | 2.35 |
| Flow rate of initiator | ml/h | 15.0 | 15.0 | 15.0 | 15.0 | 15.0 | 7.0 | 23.0 | 23.0 | 17.0 | 15.0 | 15.0 | 26.0 | 17.0 | 18.5 |
| Fillers ($CaCO_3$) | | — | — | — | — | — | — | — | — | — | BLH | BLH | BLH | BLH sec | BLH sec |
| Concentration | % g/g | 0 | 0 | 0 | 0 | 0 | 0 | 0 | 0 | 0 | 15 | 15 | 25 | 26 | 36 |
| Max. temperature | °C. | 142 | 142 | 142 | 142 | 142 | 144 | 149 | 149 | 145 | 153 | 156 | 144 | 145 | 145 |
| Linear speed of the film | m/min | 2.0 | 4.0 | 6.0 | 8.0 | 10.0 | 2.0 | 2.0 | 4.0 | 2.0 | 2.0 | 4.0 | 2.0 | 2.0 | 2.0 |
| Lay-flat width (½) | cm | 18 | 18 | 18 | 18 | 18 | 15 | 23 | 28 | 17 | 25 | 25 | 18 | 16 | 23 |
| Thickness | μm | 57 | 30 | 20 | 17 | 10 | 74 | 90 | 40 | 57 | 58 | 34 | 88 | 83 | 75 |
| Axial drawing | | 4.5 | 9.0 | 13.5 | 17.9 | 22.4 | 4.4 | 2.6 | 5.2 | 5.0 | 3.3 | 6.7 | 3.5 | 4.5 | 4.2 |
| Swelling | | 3.7 | 3.7 | 3.7 | 3.7 | 3.7 | 2.9 | 4.7 | 5.6 | 3.4 | 4.9 | 4.9 | 3.5 | 3.2 | 4.5 |
| $M_n$ | kg/mol | 44 | 44 | 44 | 44 | 44 | 83 | ND | ND | 32 | 50 | 50 | 30 | 32 | 36 |
| Theoretical $M_n$ | kg/mol | 48 | 48 | 48 | 48 | 48 | 105 | 53 | 54 | 36 | 58 | 58 | 31 | 36 | 33 |
| LS | % | 1.175 | | 2.75 | | 3.25 | 2.15 | | | 1.35 | 0.55 | 3.1 | 0.35 | 0.75 | 0.35 |
| TS | % | 0.275 | | 0.325 | | 0.05 | 1.35 | | | 0.225 | 0.325 | 0.525 | −0.1 | −0.1 | 0.05 |
| LE | MPa | 1025 | | 1000 | | | 525 | | | | 605 | | 960 | | 845 |
| TE | MPa | 1090 | | 1220 | | | 525 | | | | 780 | | 1230 | | 1190 |
| $e_b$ (L) | % | 395 | 360 | 245 | | 130 | 440 | | | 343 | 675 | 395 | 280 | | 65 |
| $e_b$ (T) | % | 320 | 170 | 345 | | 380 | 490 | | | 100 | 770 | 735 | 50 | | 78 |

ND = Not determined

TABLE 2

| | | Example | | | | | | | | | | | |
|---|---|---|---|---|---|---|---|---|---|---|---|---|---|
| | | 15R | 16R | 17R | 18R | 19R | 20R | 21R | 22R | 23R | 24R | 25R | 26R |
| Flow rate | kg/h | 2.9 | 3.4 | 2.9 | 2.2 | 3 | 2.4 | 2.4 | 3.1 | 3 | 3.1 | 3.2 | 3.2 |
| Screw speed | rpm | 50 | 63 | 50 | 40 | 52 | 40 | 40 | 64 | 64 | 64 | 53 | 53 |
| Max. temperature | °C. | 110 | 111 | 110 | 107 | 112 | 107 | 107 | 111 | 120 | 120 | 116 | 116 |
| Linear speed | m/min | 2 | 2 | 2.4 | 3.16 | 2 | 2 | 2.9 | 2 | 2 | 2.67 | 2 | 2.6 |
| Lay-flat width | cm | 17.5 | 14.7 | ~15.0 | 16.5 | ~17.5 | 13.8 | NM | 18.5 | NM | NM | 19.5 | 18 |
| Thickness | μm | 60 | ND | ND | ND | ~65 | ND | NM | ND | NM | NM | 60 | 40 |
| Axial drawing | | 2.9 | 2.5 | 3.5 | 6.0 | 2.8 | 3.5 | 5.0 | 2.7 | 2.8 | 3.6 | 2.6 | 3.4 |
| Swelling | | 3.7 | 3.1 | 3.2 | 3.5 | 3.7 | 2.9 | | 3.9 | NM | NM | 4.1 | 3.8 |
| Stability | | OK | limit | pulse | vibrates | pulse | OK | pulse | OK | limit | pulse | OK* | limit |
| Duration of storage | days | 21 | | | 120 | 32 | 20 | | | | | 21 | |
| $M_w$ | kg/mol | 90 | | | | 65# | 96 | | 94 | | | 111 | |
| $M_n$ | kg/mol | 43◊ | | | | 31◊ | 46◊ | | 45 | | | 50 | |

NM: Not measurable
◊ Estimated on the basis of a polydispersity index of 2.1
*Loss of stability by reducing the flow rate of cooling air
Apparent molecular mass Mw estimated from the shear viscosity

TABLE 3

| Examples | | 27R | 28R | 29R |
|---|---|---|---|---|
| Flow rate | kg/h | 2.43 | 2.95 | 2.95 |
| Screw speed | rpm | 44 | 44 | 44 |
| Max. temperature | ° C. | 113 | 126 | 126 |
| Linear speed | m/min | 2 | 2.95 | 2.95 |
| Lay-flat width | cm | 10.2* | 13.4 | ~16.5 |
| Axial drawing | | 3.4 | 4.2 | 4.2 |
| Swelling | | 2.2* | 2.8 | 3.5 |
| Stability | | OK | OK | pulse |
| $M_w$ | kg/mol | 100# | 115# | |
| $M_n$ | kg/mol | ND | 62 | |

*Loss of stability on wishing to increase the diameter of the bubble slightly
Apparent molecular mass $M_w$ estimated from the shear viscosity

What is claimed is:

1. A process for manufacturing a blown film comprising a polymer consisting essentially of an aliphatic polyester, according to which:

(1) the polyester is synthesized from at least one cycloaliphatic ester, with the intervention of an initiator comprising at least one metal trialkoxide and/or metal tetraalkoxide, in an extrusion device;

(2) the polyester is extrusion blow-moulded, immediately after it has been synthesized in the said extrusion device, fitted for this purpose with an extrusion-blow-moulding die, with a swelling ratio of at least 2.5.

2. The process according to claim 1, in which the polyester is a poly-ε-caprolactone.

3. The process according to claim 1, in which the polyester has a number-average molecular mass of less than 74,000 g/mol.

4. The process according to claim 1, in which the polyester is synthesized with the intervention of an initiator comprising at least one metal trialkoxide.

5. The process according to claim 4, in which the metal trialkoxide is an aluminium trialkoxide.

6. The process according to claim 1, in which the film comprises from 15 to 50% by weight of at least one filler, relative to the weight of the polyester.

7. The process according to claim 1, in which the film undergoing extrusion blow-moulding is cooled exclusively by a stream of gas.

8. The process according to claim 1, in which the draw ratio is at least 2.5.

9. The process according to claim 1, in which the draw ratio and the swelling ratio are at least 3.

10. The process according to claim 1, wherein the polymer consists of no more than 5% of a polymer that is not an aliphatic polyester.

11. The process according to claim 1, wherein the polymer consists of at least 95% of a polyester synthesized from at least one cycloaliphatic ester.

12. The process according to claim 1, wherein the polymer consists of less than 20 mole percent of cyclic comonomers that are not cycloaliphatic esters.

* * * * *